(12) United States Patent
Huizenga

(10) Patent No.: US 8,752,055 B2
(45) Date of Patent: Jun. 10, 2014

(54) METHOD OF MANAGING RESOURCES WITHIN A SET OF PROCESSES

(75) Inventor: Gerrit Huizenga, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1774 days.

(21) Appl. No.: 11/747,175

(22) Filed: May 10, 2007

(65) Prior Publication Data

US 2008/0282253 A1 Nov. 13, 2008

(51) Int. Cl.
*G06F 9/46* (2006.01)
*G06F 15/173* (2006.01)
*G06F 17/00* (2006.01)

(52) U.S. Cl.
USPC ............ 718/102; 718/103; 718/104; 709/225; 726/1

(58) Field of Classification Search
USPC .......................................... 718/104
See application file for complete search history.

(56) References Cited

U.S. PATENT DOCUMENTS

| | | | | |
|---|---|---|---|---|
| 5,504,894 A | * | 4/1996 | Ferguson et al. ...................... 1/1 |
| 5,528,513 A | * | 6/1996 | Vaitzblit et al. ............... 718/103 |
| 6,263,359 B1 | * | 7/2001 | Fong et al. ..................... 718/103 |
| 6,560,649 B1 | * | 5/2003 | Mullen et al. ................. 709/226 |
| 6,728,748 B1 | * | 4/2004 | Mangipudi et al. ........... 718/105 |
| 7,107,403 B2 | * | 9/2006 | Modha et al. ................. 711/129 |
| 7,228,354 B2 | * | 6/2007 | Chambliss et al. ........... 709/229 |
| 7,269,612 B2 | * | 9/2007 | Devarakonda et al. ....... 707/694 |
| 7,395,537 B1 | * | 7/2008 | Brown et al. ................. 718/104 |
| 7,472,159 B2 | * | 12/2008 | Freimuth et al. .............. 709/203 |
| 7,593,948 B2 | * | 9/2009 | Suggs et al. ........................... 1/1 |
| 7,665,090 B1 | * | 2/2010 | Tormasov et al. ............. 718/104 |
| 7,752,624 B2 | * | 7/2010 | Crawford et al. ............. 718/104 |
| 7,801,976 B2 | * | 9/2010 | Hodges et al. ................ 709/223 |
| 2001/0039559 A1 | | 11/2001 | Eilert et al. .................... 709/104 |
| 2003/0061362 A1 | | 3/2003 | Qiu et al. ........................... 15/16 |
| 2004/0230675 A1 | * | 11/2004 | Freimuth et al. .............. 709/223 |
| 2004/0243692 A1 | * | 12/2004 | Arnold et al. ................. 709/220 |
| 2004/0243699 A1 | * | 12/2004 | Koclanes et al. ............. 709/224 |
| 2005/0091353 A1 | * | 4/2005 | Gopisetty et al. ............. 709/223 |
| 2005/0131982 A1 | * | 6/2005 | Yamasaki et al. ............. 709/200 |
| 2005/0154861 A1 | | 7/2005 | Arimilli et al. ................ 712/216 |
| 2005/0188089 A1 | * | 8/2005 | Lichtenstein et al. ........ 709/226 |
| 2005/0198275 A1 | * | 9/2005 | D'Alo et al. .................. 709/224 |
| 2005/0216908 A1 | * | 9/2005 | Keohane et al. .............. 717/174 |
| 2006/0117317 A1 | * | 6/2006 | Crawford et al. ............. 718/104 |
| 2006/0136928 A1 | * | 6/2006 | Crawford et al. ............. 718/105 |
| 2006/0271544 A1 | * | 11/2006 | Devarakonda et al. ........... 707/9 |
| 2007/0094452 A1 | * | 4/2007 | Fachan .......................... 711/137 |
| 2008/0155100 A1 | * | 6/2008 | Ahmed et al. ................. 709/226 |
| 2008/0222311 A1 | * | 9/2008 | Lee et al. .......................... 710/6 |

* cited by examiner

*Primary Examiner* — Abdullah Al Kawsar
(74) *Attorney, Agent, or Firm* — Lieberman & Brandsdorfer, LLC

(57) ABSTRACT

A workload management system where processes associated with a class have resource management strategies that are specific to that class is provided. The system includes more than one class, with at least one unique algorithm for executing a workload associated with each class. Each algorithm may comprise a strategy for executing a workload that is specific to that class and the algorithms of one class may be completely unrelated to the algorithms of another class. The workload management system allows workloads with different attributes to use system resources in ways that best benefit a workload, while maximizing usage of the system's resources and with minimized degradation to other workloads running concurrently.

11 Claims, 6 Drawing Sheets

METHOD OF MANAGING RESOURCES WITHIN A SET OF PROCESSES

BACKGROUND OF THE INVENTION

1. Field of the Invention

The present invention relates to application workload management in a computing environment, and more particularly, the invention is directed to a system and method for workload management where processes affiliated with a class have resource management strategies that are specific to that class for advanced resource management.

2. Background Information

By way of background, large scale applications depend upon computing systems to receive, process, and store data. These computing systems may include one or more computers that may be networked together, forming a computer network. As can be appreciated, computer networks may include a multiplicity of computers that are networked together with each computer in the network configured with one or more processors, memory devices, and data storage devices.

The quantity and types of tasks that the network is requested to execute can very greatly. There are instances when some or a portion of the network's resources, including processors, memory, and data storage devices, are not in use, while there are other instances when some or most of the network's resources are used at capacity. In some instances, the network may be requested to execute tasks beyond its capacity. Thus, the workload on networks can vary substantially.

Workload management involves the intelligent sharing of resources among plural applications without any one application unfairly dominating the usage of the resources and thereby degrading the performance of peer applications. Fairness of application usage is defined by an administrator setting policies regarding a particular application's minimal and maximal access to key, shared resources. Exemplary resources that can be managed in this fashion include processor (CPU) time, memory, data storage device input/output (IO) bandwidth, and network bandwidth.

Typically in workload management systems, a determination is made, as to how much of a given resource or set of resources, will be needed by sets of processes that will be utilizing the resource or resources. Limits are then set on the resources, such as minima and maxima, for the sets of processes. These sets of processes are often identified as a class or a workload.

A workload management system is disclosed in U.S. Pat. No. 7,073,177 B2, to Foote et al. (the '177 patent), which is directed to a resource managing system for changing resource consumption state of the lower priority resource entity to more restrictive state when resources reach a critical level. Disclosed therein, a resource manager monitors the availability of resources and determines if a resource is critically short or reaches a particular usage level. When it is determined that the resource has reached a particular usage level, the resource manager selects a resource entity based on one or more criteria, and the resourced entity is requested to change is resource consumption state to a more restrictive state. The one or more criteria may include a priority value for each resource entity of the system. Resource entities with a lower priority value may be requested to change resource consumption before resource entities with a higher priority value. A disadvantage of the system of the '177 patent is that when resource consumption reaches a critical level, consumption of the resource is restricted. Thus, the system of the '177 patent restricts usage of the system's resources, and may not provide optimum usage of the resources.

A known open-source research operating system is K42, currently under development by International Business Machines Corporation (IBM), of Armonk, N.Y. The primary focus of K42 is an operating system that addresses performance and scalability issues of system software on large-scale, shared memory, NUMA multiprocessor computers. K42 utilizes a microkernel architecture rather than a monolithic kernel design. K42 consists of a small exception-handling component that serves as the microkernel, a fast instructions per clock (IPC) mechanism called protected procedure call (PPC), and servers for all other components of the operating system. These servers exist in separate address spaces and rely upon the fast IPC mechanism for communication with the microkernel and other servers. While K42 discusses the possibility of replacing system algorithms on a per-process level, it does not factor it into a global resource management strategy. K42 also does not associate this ability to manage resources into a process classification system similar to existing workload management systems.

While known workload management systems allow a set of parameters to be set, per-class, for a single algorithm, a disadvantage is that they do not afford the use of resource management policies that take into account the parameters of a workload that are not dealt with in any way by the policies of any other class. Another disadvantage of known workload management systems, is that the polices thereof are implemented using a single, tunable algorithm. While a single, tunable algorithm may be altered for different policies, it may not be adequate to account for the parameters of workloads of other classes.

Therefore, there exists a need in the art for a workload management system where the resource management policies of a class may include workload attributes that take into account parameters of a workload that are not dealt with in any way by the policies of any other class.

SUMMARY OF THE INVENTION

The foregoing problems are solved and an advance in the art is obtained by a novel method, system and computer program product for a workload management system. An embodiment of the invention comprises a workload management system where processes affiliated with a class have resource management strategies that are specific to that class.

The workload management system uses per-class schedulers for resource management. Using per-class schedulers may allow workloads with different attributes to use their resources in ways that best benefit that workload, while maximizing usage of the system's resources and with minimized degradation to other workloads running concurrently.

An embodiment of the system includes at least one resource management policy that is affiliated with a class. A resource management policy of one class may include workload attributes that take into account parameters of a workload that are not dealt with in any way by the one or more resource management policies of any other class. Therefore, each resource management policy may comprise a strategy or strategies for managing a workload or workloads that are specific to that policy and class and may be completely unrelated to the strategy or strategies for managing a workload or workloads of another class.

Each resource management policy may be implemented by an algorithm for executing a workload. For example, each resource management policy may be implemented by a disk Input/Output (IO) management algorithm. Different polices may be implemented by completely different and unique algorithms that co-exist on the system at the same time and manage the same resource. The invention differs from the prior art, wherein all classes shared a single, system-wide, tunable algorithm.

A disk IO management algorithm may comprise one or more known algorithms. These algorithms may include per-class algorithms, such as read-ahead algorithms, read-mostly algorithms, or write-mostly algorithms, for example. These algorithms may be applicable to any number of suitable forms of resource management, beyond the scope of resources described and discussed herein.

DESCRIPTION OF THE PREFERRED EMBODIMENTS

A workload management system where processes associated with a class have resource management strategies that are specific to that class. The workload management system may include more than one class, with at least one unique algorithm for executing a workload associated with each class. Each algorithm may comprise a strategy for executing a workload that is specific to that class and the algorithms of one class may be completely unrelated to the algorithms of another class. The workload management system allows workloads with different attributes to use system resources in ways that best benefit a workload, while maximizing usage of the system's resources and with minimized degradation to other workloads running concurrently.

Figure 1:
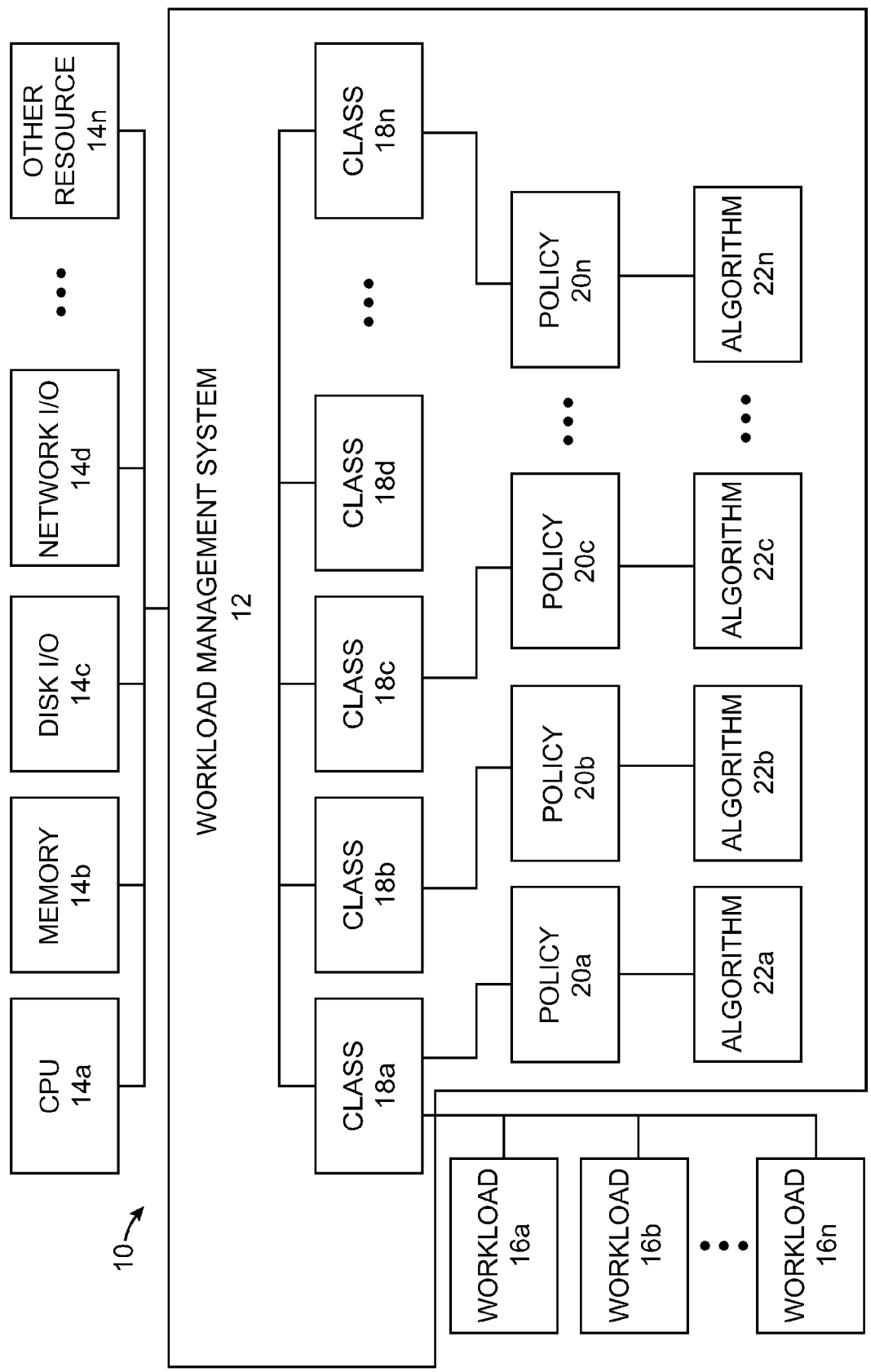
FIG. 1 is a functional block diagram showing a workload management system operable on a data processing system in accordance with the invention.

Referring to the Drawing figures wherein like reference numerals indicate like components in all of the several views, FIG. 1 illustrates an exemplary data processing system 10 hosting a workload management system 12. The data processing system 10 may be a single or multi-processor (e.g., SMP or NUMA) machine, a cluster of machines, or an implementation of any other desired computer architecture.

The workload management system 12 manages a set of resources, such as data processing resources 14a-14n for use by plural workloads 16a-16n, where the number "n" is arbitrary in both cases. The job of the workload management system 12 is to dynamically and independently manage and optimize usage the resources 14a-14n of the data processing system 10.

The workload management system 12 may be implemented using workload management solutions that have been modified to provide the workload management features of the invention. Examples of workload management solutions may include the IBM® AIX® 5L Workload Manager and the Linux® CKRM (Class-based Kernel Resource Monitor) framework. Both workload management systems support operating system resource allocation based on application groupings, and include user interfaces (e.g., the Resource Control File System (RCFS) interface of Linux CKRM) that allow manual control by system administrators or automated control via workload management middleware. (IBM and AIX are registered trademark of International Business Machine Corporation, and Linux is a registered trademark owned by Linus Torvalds.)

Operating system kernel mechanisms may be provided that allow policy-driven differentiated service access to resources such as CPU time, memory pages, disk I/O and network bandwidth. For example, resource controllers, or schedulers, may be implemented for each allocated resource type to monitor resource usage and ensure that each task receives its specified resource share. A reporting mechanism may also be provided for reporting resource usage and other performance information to system administrators via the user interface.

Herein, a workload 16 may represent a conventional form of execution context, such as a process, task, thread, etc. or a group of one or more tasks (e.g., process, threads, etc.) having a common performance goal and potentially similar resource requirements and whose operation is managed by the data processing system 10. A user interface can be provided using any suitable technique, including system or library calls, sockets, HAL (Hardware Abstraction Layer) calls, message passing APIs, etc. A resource control file system paradigm may also be used to provide the user interface. A resource control file system comprises a tree-structured name space whose directories represent applications. Via the user interface, automatic workload management controllers can be developed that automatically manage the system. The user interface may also allow resource allocation policies to be created manually by system administrators.

As an alternative to using kernel-based solutions, the workload management system 12 could be implemented with user-level application software, such as user daemons, shared libraries, etc., that utilize operating system calls to modify and monitor operating system parameters that control application access to the resources being managed. In this implementation, a kernel resource management system such as the IBM® AIX® 5L Workload Manager and the Linux® CKRM framework need not be present. A standard non-workload management-aware operating system may be used. A further implementation option would be to design the workload management system 12 as a hybrid system that includes both operating system and user-level application functionality.

The resources 14a-14n (collectively referred to as resources 14) may represent any resource that can be utilized by a workload 16. By way of example only, FIG. 1 illustrates four well known resources; namely, a CPU resource 14a, a memory resource 14b, a disk I/O bandwidth resource 14c, and a network bandwidth resource 14d. Any number of additional resources may also be managed according to administrative needs and preferences. These resources may include, and are not limited to, any desired hardware, firmware or software entities that may be shared among the workloads 16a-16n (collectively referred to as workload 16).

The CPU resource 14a may represent CPU time, per-task time-slices, scheduling latency (e.g., for real-time tasks), etc. The memory resource 14b may represent physical memory address space. Physical memory may be controlled in the workload management system 12 by varying the number of physical or logical pages allocated to workload relative to other workloads. The disk I/O bandwidth resource 14*c* may represent disk block transfers over time. A workload having a large disk I/O bandwidth resource allocation may have its disk I/O transfers executed more rapidly than a workload having a lower disk I/O bandwidth allocation, and vice versa. Disk I/O bandwidth can be controlled in the workload management system 12 by prioritizing the disk I/O requests of one workload relative to other workloads, such as by adjusting read-ahead caching, buffering, disk write out caching and/or the number of available paths in a multipath I/O subsystem.

The network I/O bandwidth resource 14*d* may represent network throughput, latency, priorities or other throttling of network connection rates over time. A workload having a large network I/O bandwidth resource allocation will have a higher network I/O transfer rate than a workload having a lower network I/O bandwidth allocation. Network I/O throughput may be controlled in the workload management system 12 by limiting the rate of allocation of sockets, limiting the rate at which connections are processed by sockets, managing IP priority, adjusting SCTP packet/congestion control, etc., of one workload relative to other workloads.

Referring to FIG. 1, the workload management system 12 of the invention dynamically and independently manages the resources 14 of the data processing system 10 in a manner that optimizes usage of these resources. The workload management system 12 utilizes classes 18*a*-18*n* (collectively referred to as classes 18) for managing workloads 16 that use the resources 14.

One or more unique resource management policies 20*a*-20*n* (collectively referred to as policies 20) may be associated with each class 18. The resource management policies 20 provide a dynamic and independent mechanism of managing the resources 14. Each policy 20 may have attributes that are unique to the class 18 associated with the policy 20.

For example, the policy 20*a* associated with class 18*a* may have attributes that are completely unrelated to the attributes of the policy 20*b* associated with class 18*b*. The resource management policy 20*a* of one class 18*a* may include workload attributes that take into account parameters of a workload 16*a* that are not dealt with in any way by the resource management policies 20 of any other class 18. Therefore, each resource management policy 20 may comprise a unique and different strategy or strategies for managing a workload 16 that are specific to a class 18 associated with the policy 20 and may be completely unrelated to the strategy or strategies for managing a workload 16 associated with another class 18.

Exemplary unique resource management polices 20 may include governing the Input/Output (IO) scheduling and read-ahead policies of a class 18, CPU scheduling style, real time scheduling for another class, FIFO for another class, fair share scheduling for another class, and differing memory management of another class. Exemplary resource management polices 20 may also include per-class read-ahead policies for IO such as file server, Online Transaction Processing (OLTP), Decision Support, email server, web server, per-class page replacement policies, and per-class memory pre-fault policies. The per-class memory pre-fault policies may include aggressive pre-fault, lazy pre-fault, and page cluster faults. Exemplary resource management polices 20 may further include per-class network congestion avoidance/retransmission protocols, such as local area network (low packet loss), wide area network (high packet loss), low latency (Ethernet), high latency (satellite systems), for example.

One or more unique resource management algorithms 22*a*-22*n* (collectively referred to as algorithms 22) is associated with each class 18. Exemplary algorithms 22 may comprise disk IO management algorithms, network capacity management algorithms, and other applicable algorithms. The algorithms 22 may comprise a process or set of processes for executing a workload 16 that utilize the system's resources 14, within standard resource limits of a class 18 associated with the algorithm 22. The algorithms 22*a* associated with the class 18*a*, may be completely different to the one or more algorithms 22 associated with any other class 18.

The algorithms 22 may include per-class algorithms, such as read-ahead algorithms, read-mostly algorithms, or write-mostly algorithms, for example and may be applicable to any number of suitable forms of resource management. The algorithms 22 co-exist on the system 10 at the same time and manage the same resource 14. Each algorithm 22 may be implemented on the data processing system's Operating System (OS), for executing the desired workload 16.

Figure 2:
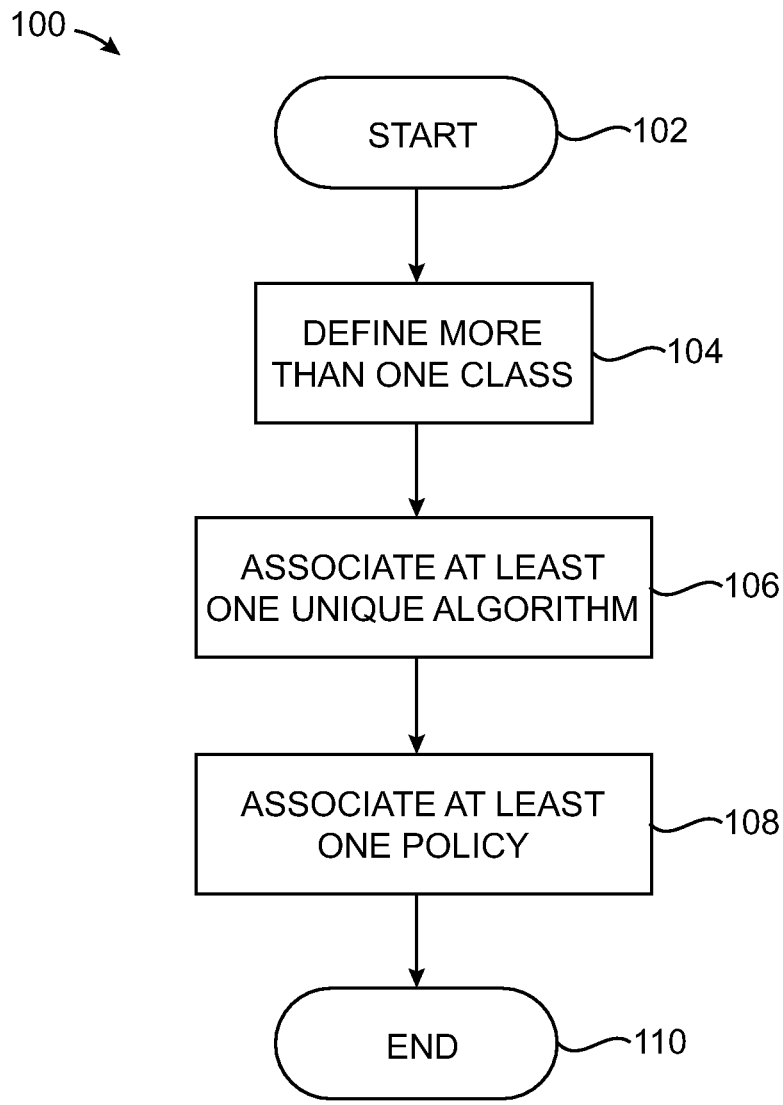
FIG. 2 is a flow diagram showing process for defining a workload management system.

Referring to FIG. 1 and FIG. 2, there is shown a flow diagram of a process 100 for defining an embodiment of the workload management system 12. The process starts in start block 102. In step 104, one or more class 18 is defined. Relevant classes 18 may be defined for handling the various different workloads 16 of a specific application of the system 12.

Upon defining one or more class 18, at least one unique algorithm 22 is associated with each class 18, in step 106. As discussed above, an algorithm 22 may comprise a process or set of processes for executing one or more workloads 16 that utilize the system's resources 14, within standard resource limits of the class 18 associated with the algorithm 22. For example, algorithms 22*a*1-22*an*, may comprise a set or processes for executing workloads 16*a*1-16*an* that utilize system resources 14 within the standard resource limits of class 18*a*.

In step 108, at least one unique resource management policy 20 is then associated with each class 18. Each resource management policy 20 may take into account parameters of a workload 16 that are not dealt with in any way by the resource management policies 20 associated with any other classes 18.

Figure 3:
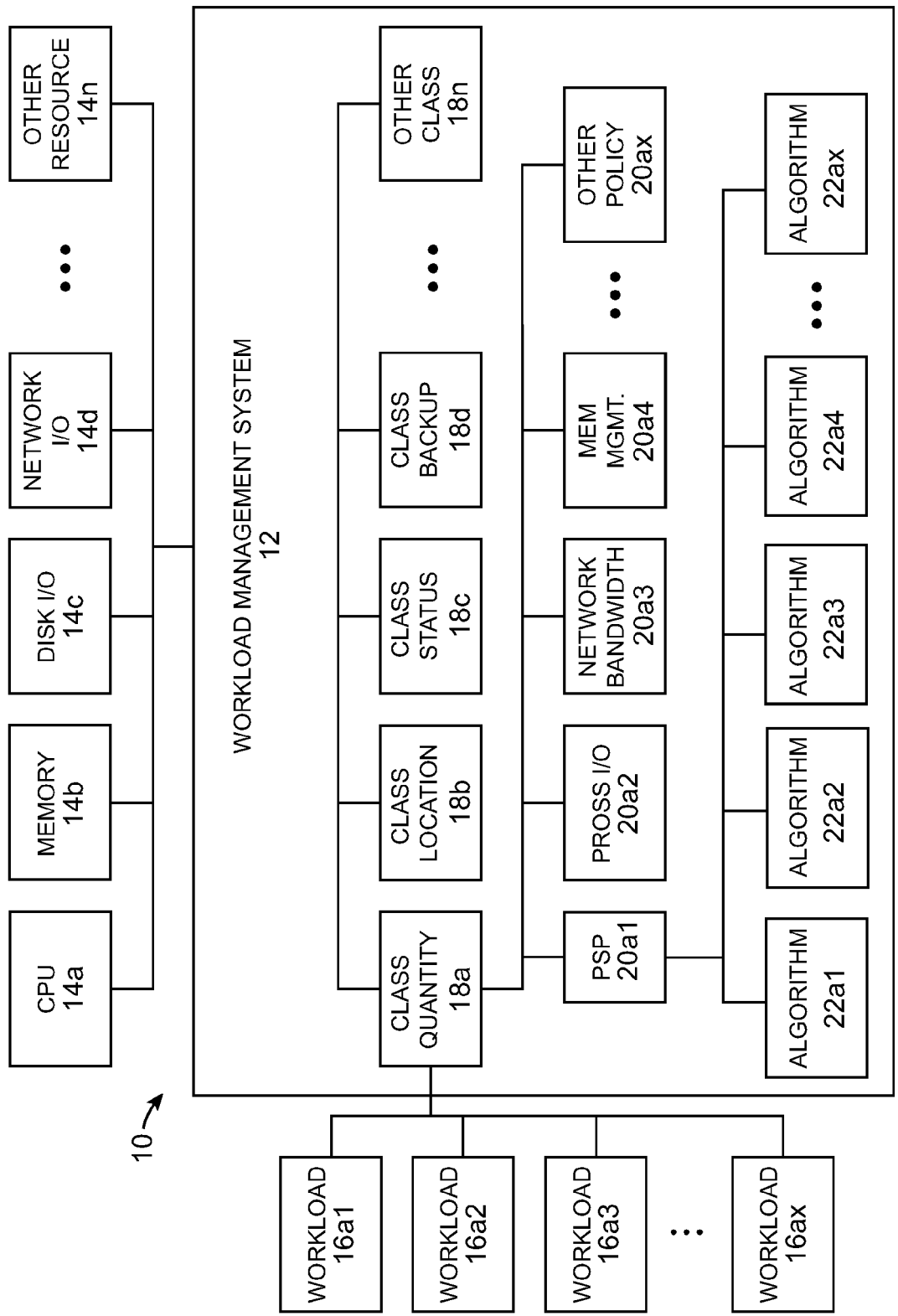
FIG. 3 is a functional block diagram showing an exemplary application of a workload management system in a data processing system.

Referring to FIG. 3, to facilitate an understanding of the workload management system 12 and for ease of discussion only, consider a specific application, such as a retail business application of the workload management system 12 running on a data processing system 10. In such an application of the work management system 12, the data processing system 10 may be requested to process numerous different workloads 16*a*1-16*ax*, each with different attributes. It is critical to use the system's resources 14 in a way that best benefits workloads 16*a*1-16*ax* to be executed, while maximizing usage of the system's resources 14 and with minimized degradation to other workloads 16*a*1-16*ax* running concurrently.

To achieve this, workloads 16*a*1-16*ax* with similar attributes are grouped together in a class 18*a*. As noted above, the workloads 16*a*1-16*ax* associated with one class 18*a* may be substantially dissimilar to the workloads of another class 18. In the exemplary business application, one or more relevant classes 18 may be created for handling the various different workloads 16*a*1-16*ax* of the application. By way of example only, exemplary classes 18 include classes dedicated to managing the inventory of one or more items of the business, such as Quantity 18*a* (for determining the quantity of the item at a retail location), Location 18*b* (for determining the location(s) of the item, such as for shipping purposes), and Status 18*c* (for determining if an item has been or will be shipped to a retail location), and Backup 18*d* (for backing up data stored on the system 10).

It is to be understood that "n" number of classes may be created as desired by an administrator or as dictated by the application and that the labeling of the classes 18a-18n herein is purely arbitrary. It is also to be understood that while each class 18 is separate and distinct from the other, the workload attributes of the one or more polices 20 of each class 18 may be as similar or diverse as dictated by the particular attributes of the workload or workloads 16 to which they relate.

As can be appreciated, the workloads 16a1-16ax preformed by class Quantity 18a may be separate and distinct from the workloads 16 performed by other classes 18b Location, 18c Status, and 18d Backup, and the policies 20 associated with each class 18 may have workload attributes that take into account parameters of their respective workloads 16 that are unique and not dealt with in any way by the policies 20 of the other classes. It should be noted that workloads 16, policies 20, and algorithms 22 associated with classes 18b-18n are not shown in FIG. 3 for simplicity only.

One or more unique algorithms 22 is associated with each class 18. Although only algorithms 22a1-22ax associated with class 18a are shown in FIG. 3, one knowledgeable in the art can easily ascertain that similar or different algorithms may be associated with other classes 18. The algorithms 22a1-22ax may comprise a process or set of processes for executing a workload 16a1-16ax, as discussed previously. The algorithms 22a1-22ax may include per-class algorithms, such as read-ahead algorithms, read-mostly algorithms, or write-mostly algorithms, for example.

One or more policies 20 are associated with each of the exemplary classes Quantity 18a, Location 18b, Status 18c, and Backup 18d. Exemplary resource management policies 20a1-20ax associated with class Quantity 18a, for example, may comprise policies that best manage the resources 14 when the data processing system 10 is processing data for determining the quantity of an item. Such exemplary policies 20a1-20ax may include Process Scheduling and Priority 20a1, Processor IO 20a2, Allocated Network Bandwidth 20a3, and Memory Management 20a4 for the tasks relating to class Quantity 18a, as well as other Policies 20ax, for other system resources used by the class 18a. It is to be understood that numerous other and different policies relating managing resources may be provided and that the above is for ease of discussion only.

Figure 4:
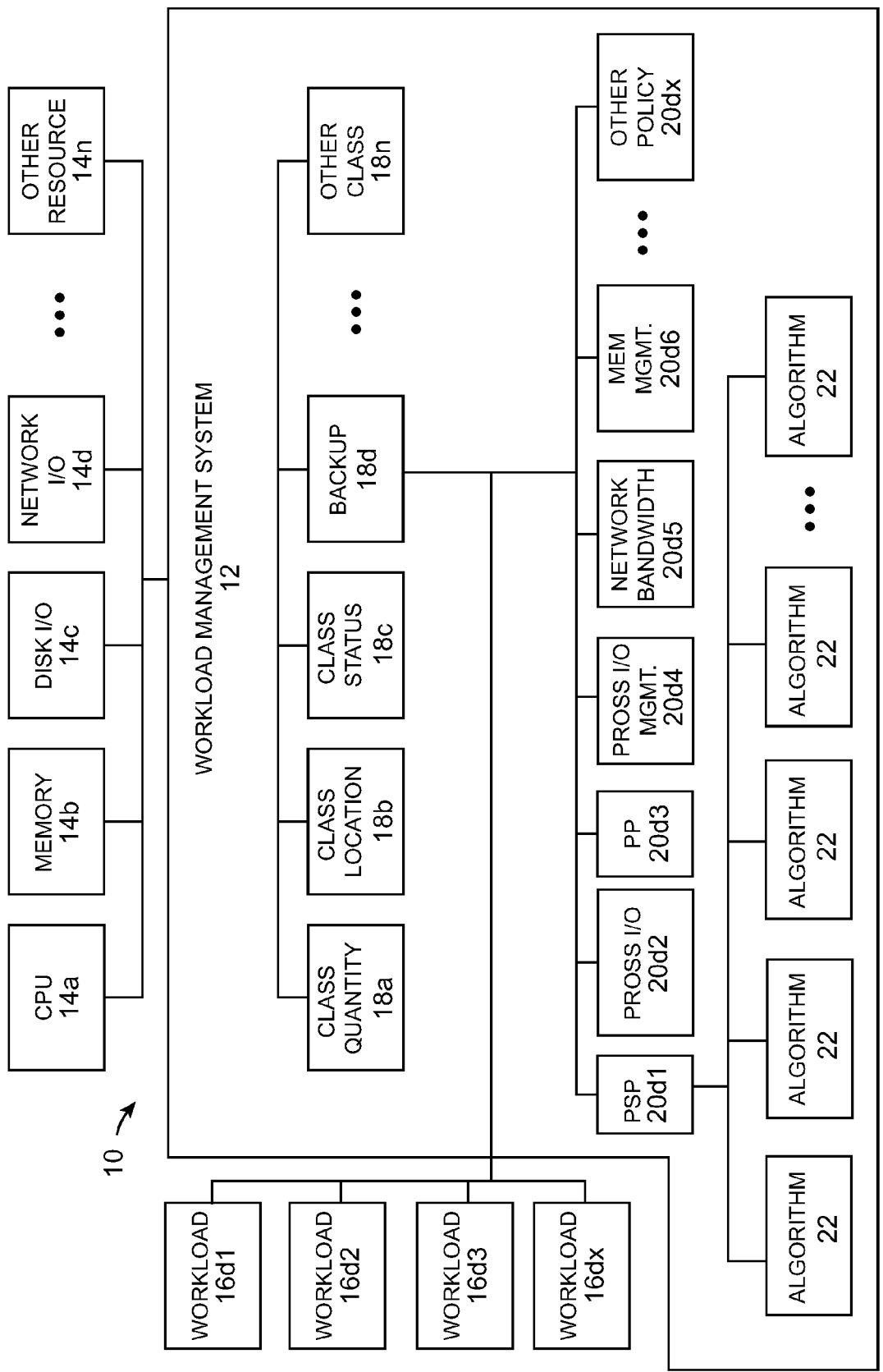
FIG. 4 is a functional block diagram showing an exemplary class structure of the exemplary application of the workload management system.

Referring to FIG. 4, in the exemplary business application, data backup comprises a workload that utilizes a substantial portion of the resources 14. Data backup is typically performed in a sequential process and is often performed at predetermined time intervals. Further, data backup may be performed by the system 10 when the demands on the resources 14 of other workloads running on the data processing system 10 are minimal.

In the exemplary business application, class Backup 18d is dedicated to the workloads 16d1-16dx associated with backing up data backup of the data processing system 10. One or more policies 20d1-20dx relating to the workloads 16d1-16dx associated with backing up data, and thus managing the resources 14a-14n during the data backup process may, be associated with class Backup 18d. Exemplary policies may include Process Scheduling and Priority 20d1, Processor TO 20d2, Priority for Processor 20d3, Processor for IO Management 20d4, Allocated Network Bandwidth 20d5, Memory Management for the backup tasks 20d6, and other Policies 20dx for other system resources used by the backup tasks.

The policies 20d1-20dx for class Backup 18d may have attributes that are particular to that class and are unique to the particular workloads 16d1-16dx of class Backup 18d and which are separate and distinct from the policies of other classes 18. Attributes of the policies 20d1-20dx in class Backup 18d may include read data once, Memory Allocation for data compression or batching of IO, minimum Network Bandwidth, Disk IO, Scheduling to keep the backup task active.

One or more algorithms 22d1-22dx is also associated with class Backup 18d. In an embodiment of the invention, the algorithms 22d1-22dx may include per-class algorithms, such as read-ahead algorithms, read-mostly algorithms, or write-mostly algorithms for executing the workloads 16d1-16dx associated with class Backup 18d, as discussed previously.

Figure 5:
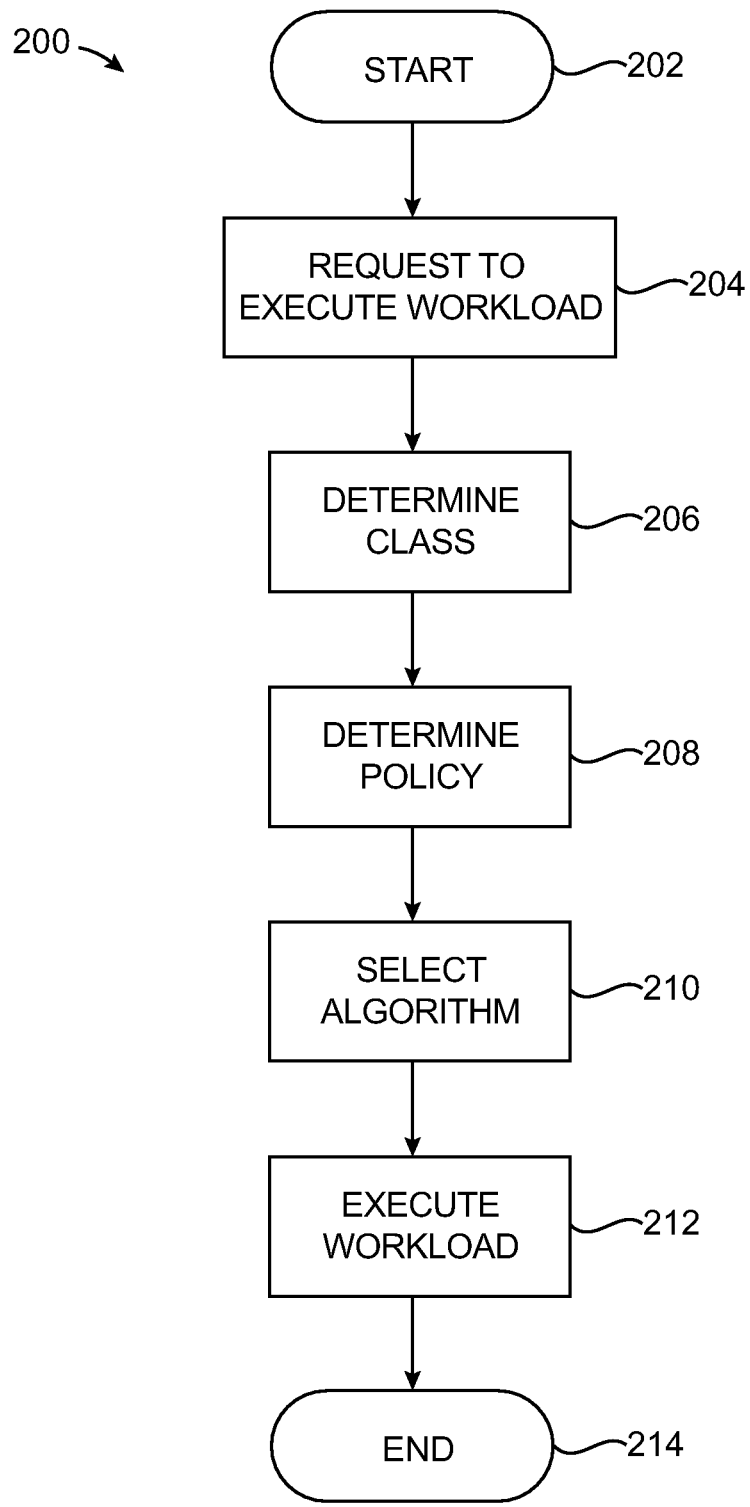
FIG. 5 is a flow diagram showing an execution of a workload process of the workload management system.

Referring to FIG. 4 and FIG. 5, there is shown a flow diagram 200 illustrating execution of a workload of the exemplary business application using the invented workload management system. Execution of the workload commences in start block 202. In process block 204, a request is received by the workload management system 12 for executing a workload, such as workloads 16d1-16dx relating to backing up data stored on the system 10.

Upon the system 12 receiving the request to use the resources 14 for executing the workload, in process block 206, the system 12 determines which class 18 is appropriate for processing the request. Since the exemplary workload relates to backing up data class Backup 18d is selected. After determining the appropriate class, in process block 208, the system 12 next determines policies 22 (In this case 20d1-20dx) associated with the determined class 18d for executing the workload. The system 12 selects at least one policy most closely related to the workload 16d1-16dx to be executed. For example, if the workload to be executed relates to usage of the memory resource 14b, the Memory Management policy 20d6 may be selected.

After selecting the policy 20d6, an algorithm 22 associated with the selected policy 20d6 and class 18d for executing the workload 16d1-16dx is determined, in process block 210. Once the system 12 determines the algorithm, such as a read-ahead algorithm 22d1, the request for executing the workload is processed in process block 212. The process 200 then ends in end block 214.

Figure 6:
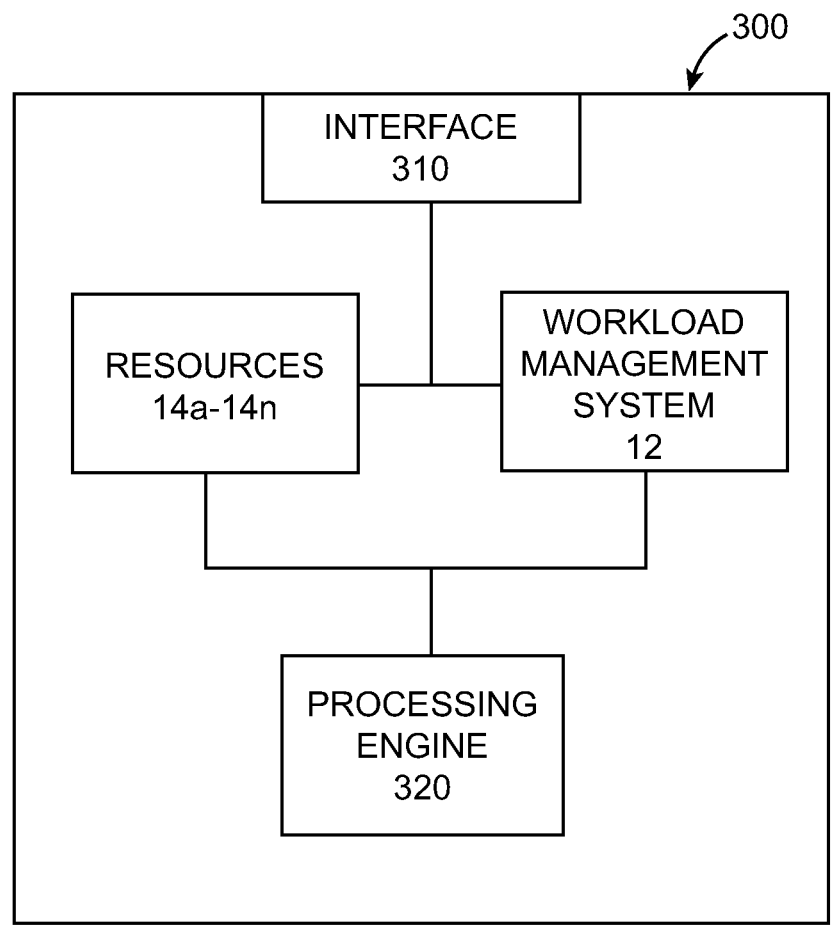
FIG. 6 is a block diagram showing an exemplary embodiment of a computing system embodying a workload management system.

Turning now to FIG. 1 and FIG. 6, the workload management system 12 that includes classes 18, resource management policies 20, and algorithms 22 for executing workloads 16 may be stored in a computing system 300. The workload management system 12, as discussed earlier, may operate as part of an operating system kernel, as user-level applications, or as hybrid systems that includes both operating system and user application functionality. The computing system 300 may comprise any suitable computing system such as a computer or computer network. The computing system 300 embodies resources 14a-14n for processing and storing data, for executing workloads 16a-16n. For example, the computing system 300 typically includes a CPU resource 14a for processing data, Memory resource 14b for temporary data storage, and other resource or resources 14n for storing data (all shown in FIG. 1).

The computing system 300 may also include a user interface 310. The user interface 310 may be implemented using any suitable technique, such as system or library calls, sockets, HAL (Hardware Abstraction Layer) calls, message passing APIs, or the file system paradigm found in the IBM® AIX® 5L Workload Manager and the Linux® CKRM (Class-based Kernel Resource Monitor) framework (discussed previously).

The computing system 300 may further include a processing engine 320. The processing engine 320 may be provided to aid with storing, coordinating, and managing the classes 18a-18n and policies 20a-20n. The processing engine 320 enables the process of configuring the algorithms 22a-22n to achieve the optimum response in each class and help optimize the use of the machine by prioritizing the task. The outputs of the processing engine 320 are provided to the workload management system 12.

The workload management system 12 and the processing engine 320 may be implemented in software, hardware, or a combination thereof. In one embodiment, the workload management system 12 and the processing engine 320 may reside in memory resource 14b.

Accordingly, a technique for managing workloads in a data processing system where the resource management policies of one class may include workload attributes that take into account parameters of a workload that are not dealt with in any way by the one or more resource management policies of any other class has been disclosed. It will be appreciated that the foregoing concepts may be variously embodied in any of a data processing system, a machine implemented method, and a computer program product in which programming logic is provided by one or more machine-readable media for use in controlling a data processing system to perform the required functions.

Figure 7:
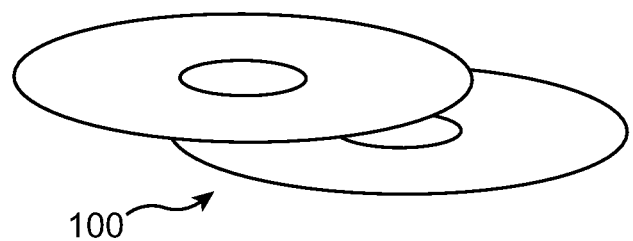
FIG. 7 is a diagrammatic illustration showing physical media that may be used to provide a computer program product for implementing a workload management system in accordance with the invention.

Machine-readable media for providing such programming logic are shown by reference numeral 100 in FIG. 7. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media comprises any electronic, magnetic, optical, semiconductor system or apparatus or device that can store programming logic for use by computer or other instruction execution system, apparatus or device.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for managing workloads in a data processing system, the method comprising:
    defining at least two different classes of workloads based upon unique attributes associated with each workload of a plurality of workloads, each of the classes associated with at least one class unique procedure for executing a workload that utilizes data processing resources and each class unique procedure is different than procedures associated with other classes, wherein each class comprises a grouping of related policies that manages the workload and considers workload attributes that are unique to the workload and the class associated with each policy, and each policy comprising at least one strategy for managing the workload specific to the class associated with each policy, the strategy considering workload attributes to the workload and the class for executing the workload with minimized degradation to running concurrent workloads and wherein multiple different class unique procedures co-exist and manage a same resource;
    receiving a request to execute one of the workloads;
    determining the class of the workload based on the workload attribute to identify the at least one unique procedure defined by the policy for executing the workload to process the request, said at least one unique procedure selected from the group consisting of: a disk I/O management algorithm, a network capacity management algorithm, and a combination thereof; and
    invoking the identified unique procedure associated with the determined class for accessing the resources requested by the workload.

2. The method of claim 1 further comprising: determining a policy associated with the determined class, the policy selecting the unique procedure to be invoked for executing the workload.

3. The method of claim 1 wherein a class comprises more than one unique procedure for executing a workload.

4. A method for managing workloads in a data processing system, the method comprising:
    defining more than one class of workloads based upon unique attributes associated with each workload of a plurality of workloads, each class associated with at least one class unique procedure for executing a workload that utilizes data processing resources and each class unique procedure is different than procedures associated with other classes, wherein each class comprises a grouping of related policies that manages the workload and considers workload attributes that are unique to the workload and the class associated with each policy, and each policy comprising at least one strategy for managing the workload specific to the class associated with each policy, the strategy considering workload attributes to the workload and the class for executing the workload with minimized degradation to running concurrent workloads and wherein multiple different class unique procedures co-exist and manage a same resource;
    receiving a request to execute one of the workloads;
    determining the class of the workload based on the workload attribute to identify the at least one unique procedure defined by the policy for executing the workload to process the request; and
    invoking the identified unique procedure associated with the determined class for accessing the resources requested by the workload, said at least one unique procedure selected from the group consisting of: a disk I/O management algorithm, a network capacity management algorithm, and a combination thereof.

5. The method of claim 4 wherein a class comprises a plurality of procedures.

6. The method of claim 5 wherein the plurality of procedures includes the at least one unique procedure.

7. The method of claim 4 wherein the disk I/O management algorithm comprises at least a selected one of a read-ahead algorithm, read-mostly algorithm, and write-mostly algorithm.

8. A system, comprising:
    a data processing resource including a processor and memory;
    a workload management system logic configured to define more than one class, each class associated with at least one class unique procedure for executing a workload that utilizes the data processing resource;

the workload management system to define more than one class of workloads based upon unique attributes associated with each workload in a plurality of workloads, each class unique procedure is different than procedures associated with other classes, wherein each class comprises a grouping of related policies that manages the workload and considers workload attributes that are unique to the workload and the class associated with each policy, and each policy comprising at least one strategy for managing the workload specific to the class associated with each policy, the strategy considering workload attributes to the workload and the class for executing the workload with minimized degradation to running concurrent workloads and wherein multiple different class unique procedures co-exist and manage the same resource;

the workload management system to receive a request to execute one of the workloads;

the workload management system to determine the class of the workload based on the workload attribute to identify the at least one unique procedure defined by the policy for executing the workload to process the request;

the workload management system to invoke the identified unique procedure associated with the determined class to access the data processing resource requested by the workload, said at least one unique procedure selected from the group consisting of: a disk I/O management algorithm, a network capacity management algorithm, and a combination thereof.

9. The system of claim 8 wherein a plurality of classes are defined, each class comprising more than one unique procedure.

10. The system of claim 8 wherein the disk I/O management algorithm comprises at least a selected one of a read-ahead algorithm, read-mostly algorithm, and write-mostly algorithm.

11. A computer program product, comprising:
a machine readable media including instructions comprising:
  instructions for defining at least two different classes of workloads based upon unique attributes associated with each workload of a plurality of workloads, each of the at least two classes associated with at least one class unique procedure for executing a workload that utilizes data processing resources and each class unique procedure is different than procedures associated with other classes, wherein each class comprises a grouping of related policies that manages the workload and considers workload attributes that are unique to the workload and the class associated with each policy, and each policy comprising at least one strategy for managing the workload specific to the class associated with each policy, the strategy considering workload attributes to the workload and the class for executing the workload with minimized degradation to running concurrent workloads and wherein multiple different class unique procedures co-exist and manage the same resource;
  instructions for receiving a request to execute one of the workloads;
  instructions for determining the class of the workload based on the workload attribute to identify the at least one unique procedure defined by the policy for executing the workload to process the request; and
  instructions for invoking the identified unique procedure associated with the determined class for accessing the resources requested by the workload, said at least one unique procedure selected from the group consisting of: a disk I/O management algorithm, a network capacity management algorithm, and a combination thereof.

* * * * *